Sept. 11, 1923.　　　　　　　　　　　　　　　1,467,540
E. L. FORD
APPARATUS FOR CONVEYING AND HANDLING PUDDLE BALLS
Filed March 19, 1921　　　5 Sheets-Sheet 1

Sept. 11, 1923.   
E. L. FORD  
1,467,540  
APPARATUS FOR CONVEYING AND HANDLING PUDDLE BALLS  
Filed March 19, 1921   5 Sheets-Sheet 3

INVENTOR.  
E. L. Ford  
by Bakewell, Byrnes & Parmelee  
his Attys

Sept. 11, 1923.  
E. L. FORD  
APPARATUS FOR CONVEYING AND HANDLING PUDDLE BALLS  
Filed March 19, 1921  
1,467,540  
5 Sheets-Sheet 4

INVENTOR.  
E. L. Ford

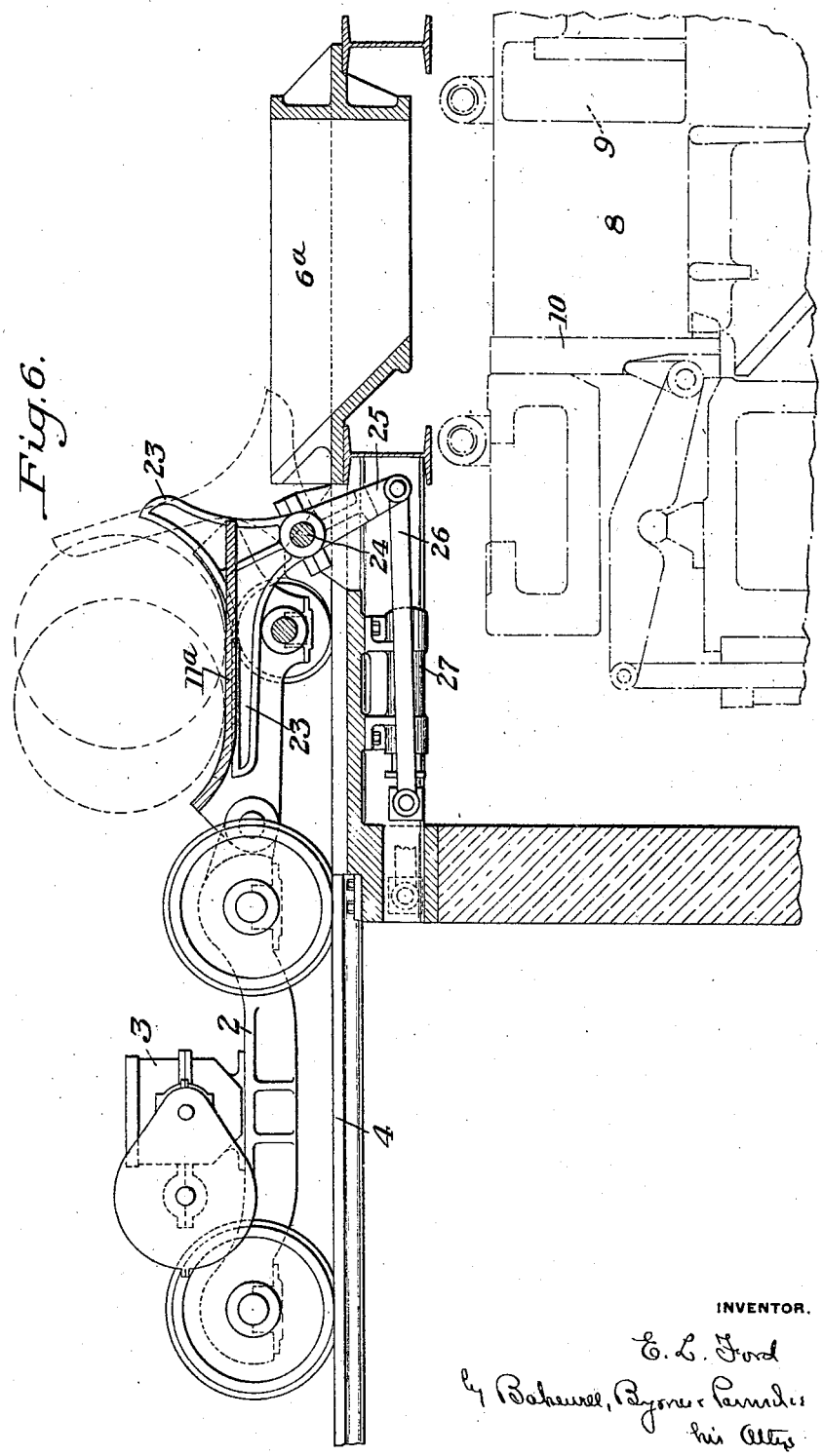

Patented Sept. 11, 1923.

1,467,540

UNITED STATES PATENT OFFICE.

EDWARD L. FORD, OF YOUNGSTOWN, OHIO.

APPARATUS FOR CONVEYING AND HANDLING PUDDLE BALLS.

Application filed March 19, 1921. Serial No. 453,802.

*To all whom it may concern:*

Be it known that I, EDWARD L. FORD, residing at Youngstown, county of Mahoning, and State of Ohio, have invented a new and useful Improvement in Apparatus for Conveying and Handling Puddle Balls, of which the following is a full, clear, and exact description, reference being had to the accompanying drawings, forming part of this specification, is which:—

Figures 5 and 6 are views similar, respectively, to Figures 1 and 2, but showing a modification.

Figure 1:
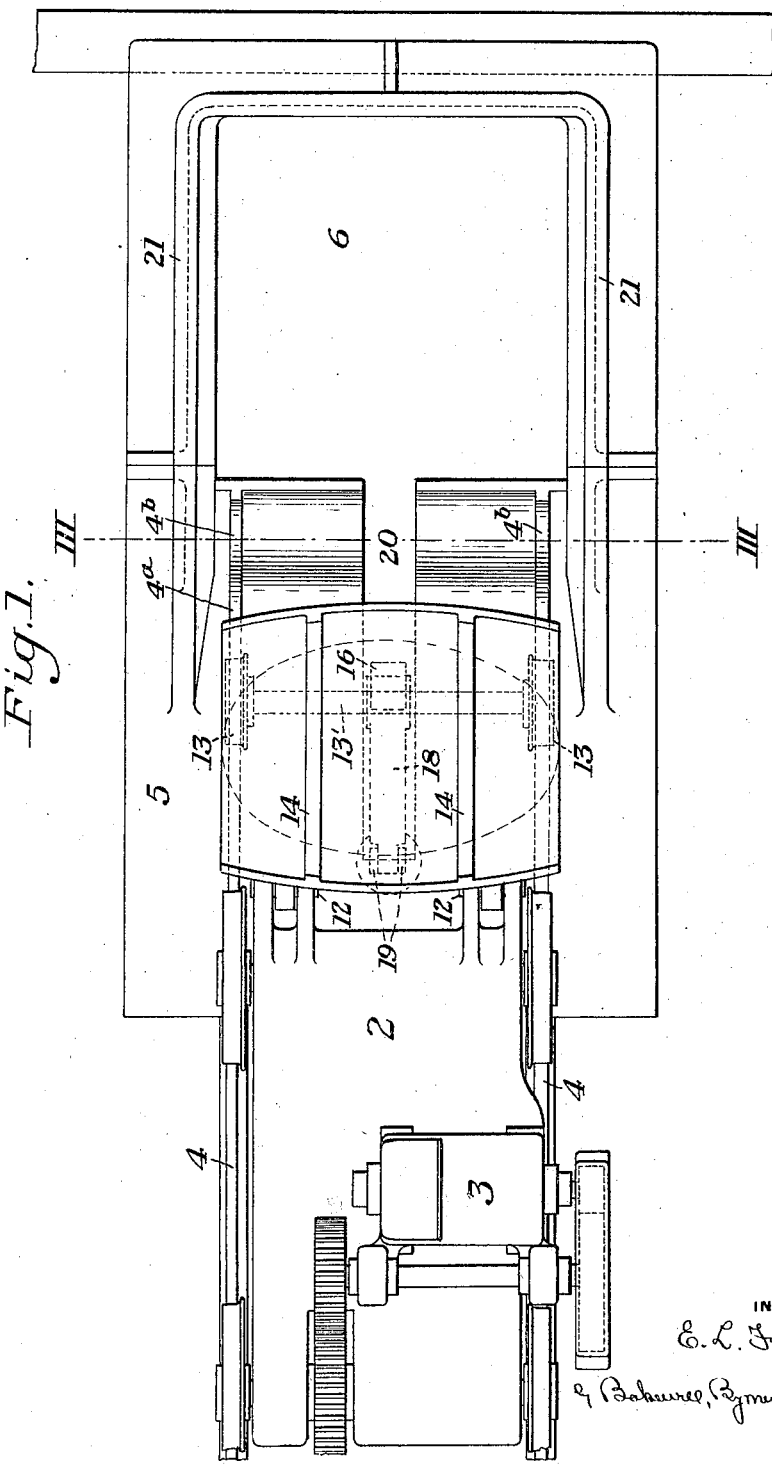
Figure 1 is a plan view of one form of apparatus embodying my invention.

My invention has relation to apparatus for conveying and handling puddle balls, and more particularly for conveying puddle balls from a puddling furnace to the press in which the balls are formed into ingots.

These balls are of egg-shape and when dropped into the press should fall in such a way that the ball is in position for immediately being squeezed without having to be aligned. The present invention is to provide means of such a character that the ball when discharged from the conveying mechanism into the press will roll almost vertically into the press instead of sliding, and thus assume the proper position.

Referring first to that form of my invention shown in Figures 1 to 4, inclusive, the numeral 2 designates a conveyor in the form of a car for conveying the balls from the puddling furnace to the press. This car may be of any suitable character and may be propelled by any suitable means, such as the electric motor 3. It travels on the tracks 4, which are extended on to a platform 5, in which is formed the hopper 6, which is immediately over the cavity 7 of the press 8. This press may be of any usual or suitable character, such, for instance, as described and claimed in the copending application of Thomas M. Phillips, Serial No. 451,452 filed March 11, 1921. 9 designates the main ram of the press and 10 the anvil opposite this ram.

The car 2 is provided at its forward end with a cradle 11, which forms the support for the balls. This cradle is pivotally mounted at its rear side, as indicated at 12, to the front end of the car proper, being also supported by the wheels 13 on the axle 13'. In the construction shown, the cradle has approximately the form of a longitudinal section of a barrel with the two parallel ribs 14 which extend substantially parallel with the longitudinal axis of the car. These ribs are so spaced that they will support the puddle ball (indicated in dotted lines) substantially half way between the middle of the ball and the end at each side. The extensions 4ª of the tracks 4 terminate in the downwardly curved portions 4ᵇ, having the wheel rests 15 at their lower ends, these ends terminating a short distance in the rear of and above the press cavity.

Figure 2:
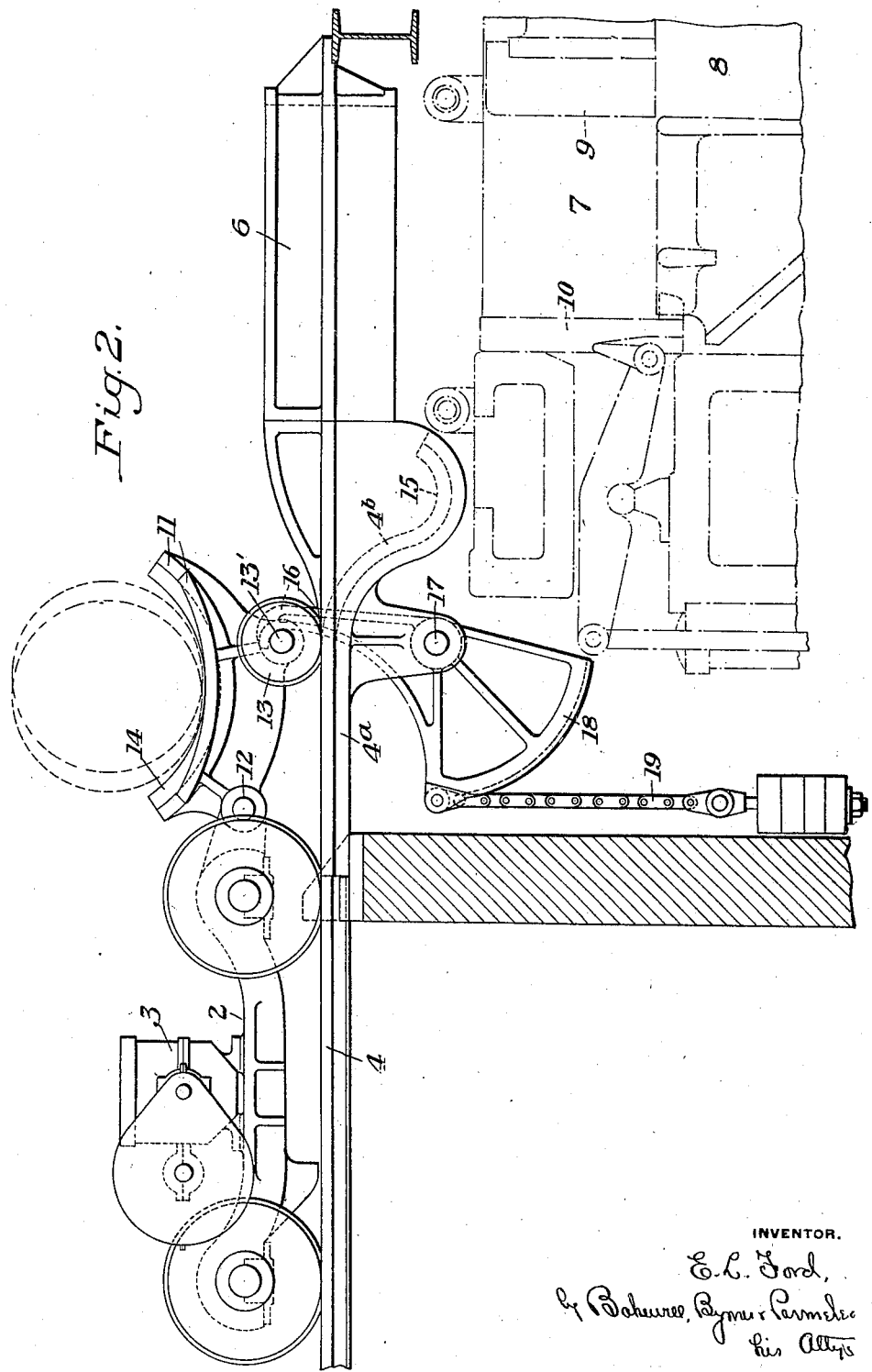
Figure 2 is a side elevation with certain parts in section and a portion of the press shown in dotted lines.
Figure 3:
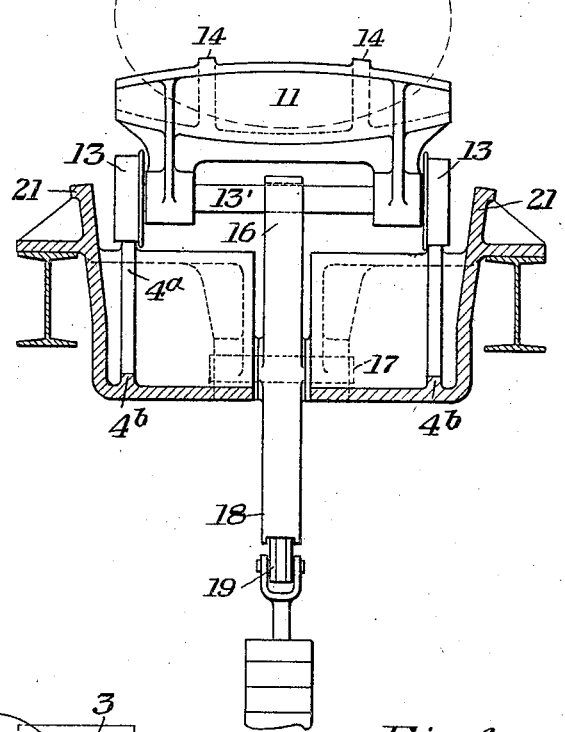
Figure 3 is a section on the line III—III of Figure 1.
Figure 4:
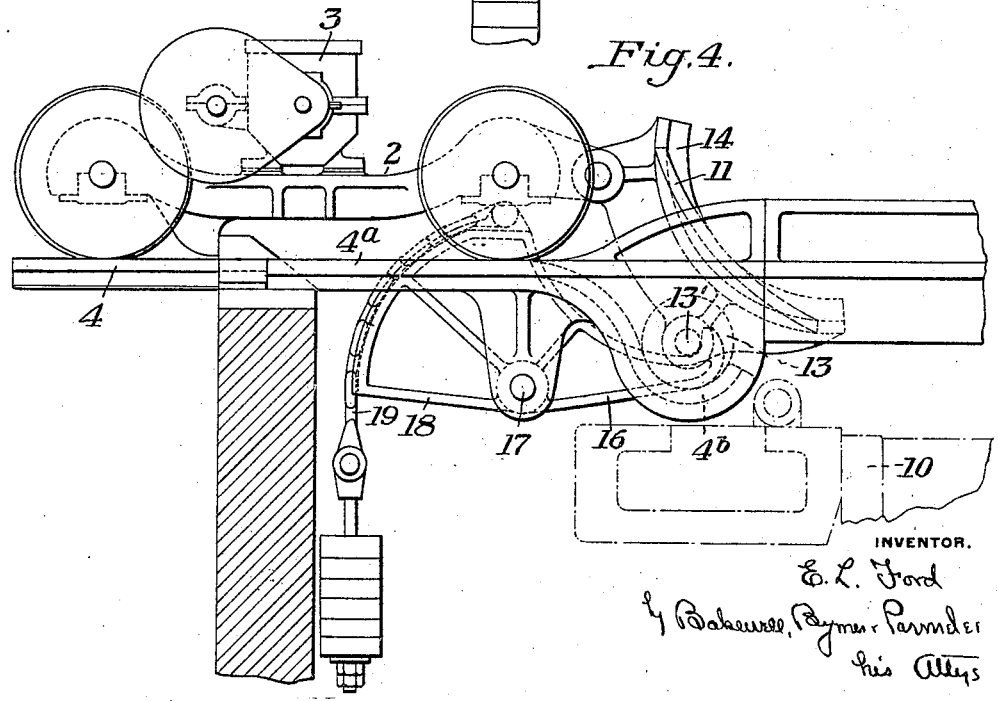
Figure 4 is a view similar to Figure 2, but showing some of the parts in different positions.

16 is a lever having an upwardly extending arm adapted to engage the axle 13' when the car reaches the position shown in Figures 1 and 2. This lever is pivoted at 17 and has a segment 18, to which is connected a weighted chain 19, which normally holds the arm 16 in the position shown in Figure 2. Said lever works in a slot 20, in the platform 5. This platform is preferably provided with the guards 21.

The operation is as follows: When the car reaches the position shown in Figure 1 and 2, the axle 13' contacts with the lever 16, pushing said lever forwardly and downwardly as the wheels 13 ride downwardly upon the depressed portions 4ᵇ of the track rails. The corresponding movement of the lever 16 raises the weight on the chain 19, to the position shown in Figure 4. When the wheels reach the seats 15, the puddle ball will roll off from the cradle and through the hopper into the press. This rolling movement will be of such character that the ball is kept aligned, and any tendency for one end to slide ahead of the other is minimized. There may be considerable variation in the position of the ball on the cradle, as indicated in dotted lines in Figure 2, without affecting the proper discharge of the ball into the press.

Figure 5:
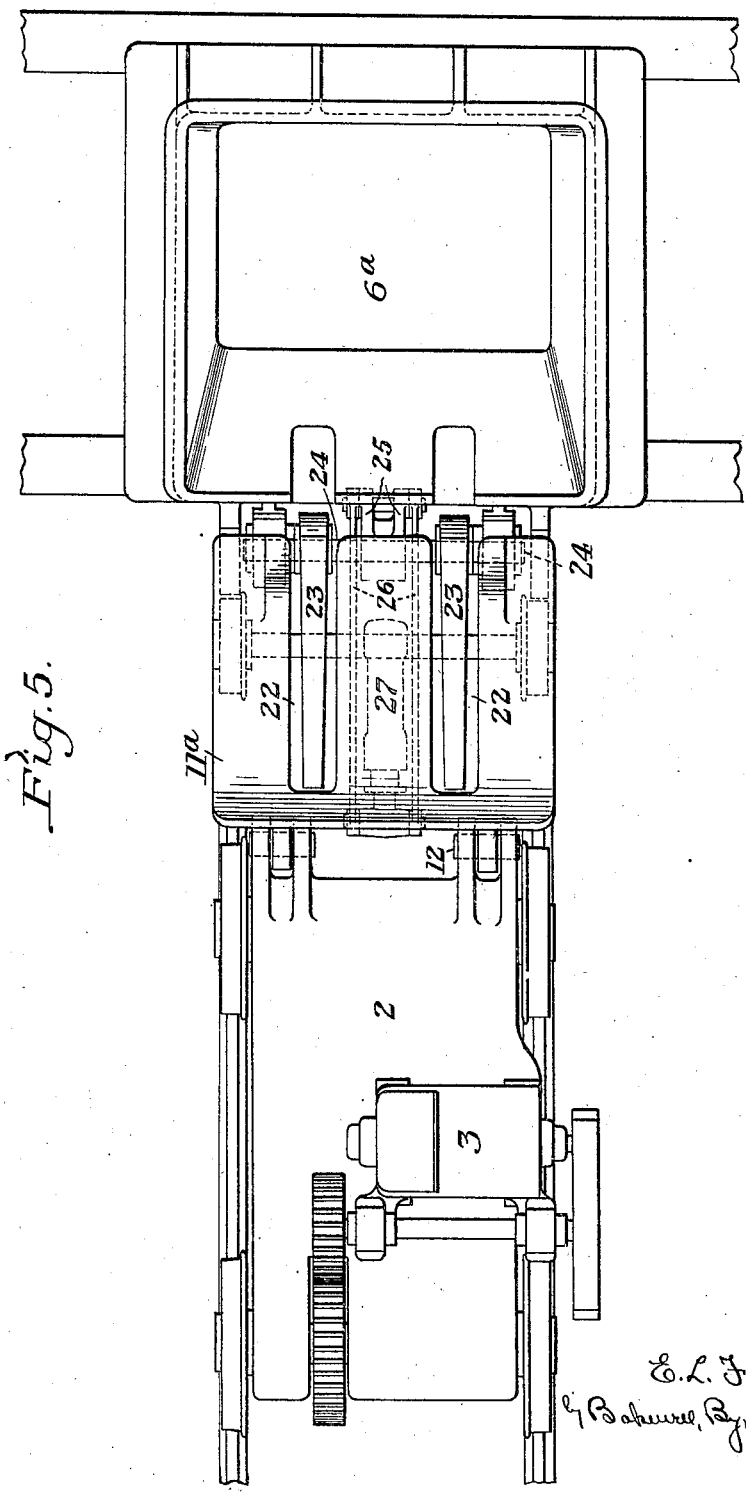

In the form of my invention shown in Figures 5 and 6, instead of tilting the cradle 11ª to discharge the ball into the hopper 6ª of the press, the cradle is formed with two slots 22, in which work two rocker arms 23, which correspond approximately in position to the position of the ribs 14 in the form first described. These rocker arms are rigidly secured to a transverse shaft 24, which is actuated by the connections 25 and 26, leading to the plunger of a power cylinder 27.

When the car reaches the position shown in full lines in Figures 5 and 6, the shaft 24 is actuated to rock the arms 23, and thereby lift the puddle ball out of the cradle, these arms moving to the position shown in dotted lines in Figure 6, causing the ball to roll therefrom through the hopper 6ª, and enter the press.

I do not wish to be limited to the particular embodiments of my invention which I have herein shown and described, as it will be obvious that the car or conveyer may be widely changed in detail and that various changes may be made in the discharging apparatus without departing from the spirit and scope of my invention as defined in the appended claims.

I claim:

1. In apparatus of the character described, a puddle ball conveyor having a cradle shaped to receive an elongated ball crosswise thereof, means associated with the cradle for engaging the under portions of the ball at each side of its minor diameter, and mechanism for tipping said engaging means to effect a rolling discharge of the ball in a path substantially at right angles to its greatest diameter, substantially as described.

2. In apparatus of the character described, a car having a cradle arranged to receive a puddle ball, a chute leading to a squeezing press, and mechanism for effecting a rolling discharge of the ball from the cradle into said chute, substantially as described.

3. In apparatus of the character described, a car having a supporting cradle arranged to receive an elongated ball transversely thereof, the cradle having portions arranged to engage the ball at each side of its central minor axis, and mechanism for operating the cradle to cause a rolling discharge of the ball through said engaging portions, substantially as described.

4. In apparatus of the character described, the combination with a car, a transversely extending cradle pivoted to the forward portion of the car, supporting wheels for said cradle, tracks for said wheels having downwardly curved portions at their ends, and means for easing the movement of the wheels on said downwardly curved portions, substantially as described.

5. In apparatus of the character described, the combination with a car, a transversely extending cradle pivoted to the forward portion of the car, a wheel axle having supporting wheels for said cradle, tracks for said wheels having downwardly curved portions at their ends, and means for easing the movement of the wheels on said downwardly curved portions, said means comprising a counterweighted lever adapted to engage the wheel axle of the cradle, substantially as described.

In testimony whereof I have hereunto set my hand.

EDWARD L. FORD.